3,121,641
COMBUSTION OF PREFORMED HOMOGENEOUS GASEOUS MIXTURE TO FORM TITANIUM DIOXIDE PIGMENT
John P. Wikswo, Amherst, and Earl W. Nelson, Lynchburg, Va., assignors to American Cyanamid Company, Stamford, Conn., a corporation of Maine
Filed Sept. 25, 1962, Ser. No. 230,307
13 Claims. (Cl. 106—300)

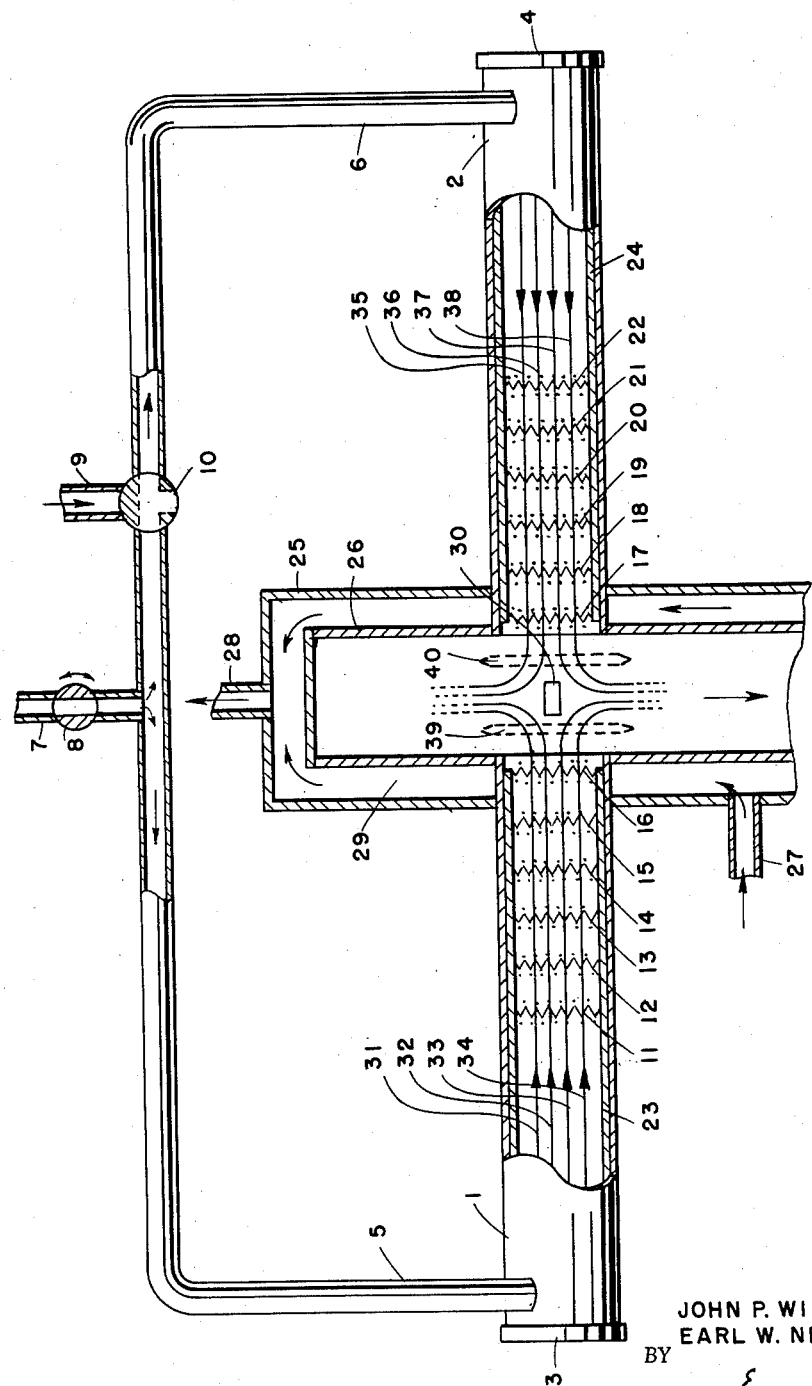

This is a continuation-in-part of our copending application Serial No. 748,742, filed on July 15, 1957 and now abandoned.

The present invention relates to the manufacture of titanium dioxide pigment by combusion of titanium tetrachloride and oxygen. The invention more particularly relates to a novel method for the manufacture of titanium dioxide pigment (both of the anatase and rutile crystal forms) by combustion of a preformed homogeneous gaseous mixture comprising titanium tetrachloride and oxygen as principal pigment-producing components under combusition conditions of improved stability.

Application Serial No. 519,892, filed on July 5, 1955, by E. W. Nelson et al., now abandoned (of which application Serial No. 772,651, now U.S. Patent No. 2,957,753, is a continuation-in-part) discloses that titanium dioxide pigment, both of anatase and rutile grades, can be prepared by burning a preformed homogeneous gaseous combustion mixture containing titanium tetrachloride and oxygen as principal pigment-producing components. According to one species of the invention, the combustion mixture is passed in uniform streamline flow down a tube and is burned as a laminar flame at the end of the tube. Pigment is produced in the fraction of a second required for the gas to pass through the flame.

The principal difficulty in the process is the instability of the flame, which is sensitive to changes in the speed and composition of the gas being burned. In laboratory tubes (smaller than about 1.5" or 2" in diameter) the flame tends to burn steadily and is not seriously affected by such changes. However, when the process is scaled up with use of production sized combustion tubes (i.e., tubes larger than 3.5" or 4" in diameter), minor fluctuations in the flow rate of the gas become significant. In general, a minor increase in the speed of the gas causes the flame to blow out, whereas a decrease in the speed of the gas causes the flame to flash back up the combustion tube. While the original flame can be re-established quite easily, combustion of the gas on a production scale requires close and continuous supervision of the flame.

The present invention is an improvement over the combustion method of the copending application referred to.

According to the present invention, titanium dioxide pigment is manufactured by burning a preformed homogeneous gaseous combustion mixture containing titanium tetrachloride and oxygen as principal pigment-producing components as a laminar flame directly against an opposing column of gas in streamline flow. The opposing column of gas may be an inert gas, a combustible gas, for example, carbon monoxide and oxygen which produces heat only, or a titanium tetrachloride containing gas which produces pigment in addition to heat.

The invention principally rests upon our discovery that the opposing column of gas acts as a springy or resilient barrier supplying a uniform mild counter-pressure which stabilizes the flame, whereby minor fluctuations in the rate of flow and composition of the combustible pigment-producing gas are adsorbed without extinguishment of the flame. The process has been successfully employed in tubes as large as 6" in diameter and the evidence is that tubes of still greater diameter may be employed.

Moreover, for reasons as yet unknown the opposing column of gas permits the pigment-producing combustible mixture to burn as a free-floating flame, with consequent decrease in the amount of pigment deposited in the burner tubes. In addition, where the opposing gas is combustible, the process appears to have higher thermal efficiency. There is radiation of substantial heat from each of the disc flames formed in the combustion to the other with consequent greater concentration of heat in the combustion area.

The invention will be more particularly illustrated with reference to the drawing, which represents a schematic view partly in front elevation and partly in vertical section of one form of apparatus for the process of the present invention, showing a combustion in progress.

The apparatus consists essentially of two spaced burner tubes 1 and 2 provided with removable end caps 3 and 4 and supplied by feeder pipes 5 and 6 set tangentially into tubes 1 and 2, whereby gas admitted to each tube is given a slow rotary motion so as to level the transverse velocity profile of the gas. Feeder pipes 5 and 6 run to pigment combustion gas supply main 7 through shut-off valve 8. Auxiliary gas supply main 9 enters feeder pipe 6 through three-way valve 10. This arrangement permits auxilary gas to be supplied to feeder pipe 6 alone. Burner tubes 1 and 2 each contain screens 11–16 and 17–22 held in removable carrier tubes 23 and 24 by a friction fit. The screens assure that the gas on combustion will have a substantially flat transverse velocity profile.

The space between the burner tubes is enclosed by a hood cooler having outer walls 25, inner walls 26, and pipes 27 and 28 for admission and outflow of coolant into the space 29 between the walls. The hood assembly is mounted over a conventional separatory system (not shown) for recovery of titanium dioxide and chlorine, and contains closable port 30 for introduction of a flame igniter, gas analysis probe, thermocouple, etc., and for direct observation of the flame. Streamlines 31–38 illustrate the flow of the gaseous streams under theoretically optimum conditions.

The piping, combustion tubes, and hood may be constructed of aluminum. The mesh size of the screens is not critical and screening in the range of 28 to 100 mesh has been successfully used. The screens are advantageously made of stainless steel.

It is within the scope of the invention to inhibit build-up of titanium dioxide on the tips of the burner tubes by use of a shielding gas. Thus for example the last few inches of the burner tubes may be constructed of porous refractory and a shielding gas may be passed inwardly therethrough as shown in Nelson et al. U.S. Patent No. 2,752,260, granted on June 12, 1956, or the shielding gas may be introduced in small amount through a peripheral slot up stream from the burner tips, the gas passing as a thin layer in streamline flow over the inner surface of the tube.

In the system, gas pressures are small. The pressure of gas in the burner tubes is usually less than 1" of water, so that strong construction is not necessary.

The apparatus may be prepared for operation as follows:

First, coolant fluid (for example Dowtherm at 250° C.) is introduced through pipe 27 and circulated through space 29 in the cooling hood, leaving through pipe 28. Valve 8 is closed to prevent access of pigment-producing gas. Auxiliary gas main 9 is connected to a propane:air combustion mixture, and the apparatus is preheated by use of this gas. Valve 10 is positioned so as to supply the gas equally to feeder pipes 5 and 6. The gas is ignited by introduction of a flame through port 30, and with proper adjustment in the flow rate the gas burns smoothly as two flat free-floating laminar flames 39 and 40 as shown in the drawing. Valve 10 is then rotated 180° to the position shown in the drawing, and valve 8 is opened so as to supply a pigment-producing gaseous combustion mixture to feeder pipes 5 and 6. After effective preheating the gas generally spontaneously ignites. The flow rate of the gas is adjusted about midway between the higher rate at which the flame is blown out and the lower rate at which the flames fail to sustain themselves, whereupon steady, uniform and comparatively stable combustion takes place.

If desired, during the combustion three-way valve 10 may be rotated counterclockwise 90° from the position shown in the drawing so as to cut off supply of titanium tetrachloride combustion gas from feeder pipe 6 and replace it with a different gas. When the different gas is inert, for example chlorine, and is supplied in equal amount, the right-hand flame goes out and the gas admitted through tube 1 burns with litle change. Formation of anatase is assisted by use of a cold inert gas, for example chlorine having a temperature below about 50° C. Alternatively, the different gas may be a combustible but non-pigment forming gas, for example a 2:1 molar ratio mixture of carbon monoxide and oxygen (with inert diluent gas).

The combustion of a mixture of titanium tetrachloride and oxygen against an opposing column of inert gas (nitrogen) according to the present invention has been directly observed. The resulting flame did not appear to be attached to the end of its burner tube but appeared to float in space as a disc, substantially like flame 39 or 40 in the drawing. Replacement of the inert gas with a combustible titanium tetrachloride gaseous mixture has little effect upon the flame already present, the second gas burning as a separate free-floating disc flame as shown in the drawing. From the drawing, it will be seen that streamlines 31–34 and 35–38 respectively do not lose their identity in passing through the combustion zone, and show that the flame or flames are essentially laminar.

The speed at which the combustion gas should be made to flow through burner tubes 1 and 2 is slow and is generally between about 10 and 30 centimeters per second depending chiefly upon the speed at which the flame propagates through the gas. This speed chiefly depends on the particular composition of the gas employed, and the temperature at which it is introduced. The optimum gas flow speed in any one instance is close to the speed at which the flame propagates; a convenient speed generally appears to be about 1 to 5 centimeters per second in excess of the speed at which the flame tends to flicker before flashing back up the tube. The speed of the gas may be increased so that the flame has the shape of a doughnut. However, pigment of a greater average uniformity is generally obtained when the flame is substantially flat, and accordingly such flame is preferred.

The process of the present invention produces anatase or rutile pigment as preferred. The formation of anatase is favored by burning a titanium tetrachloride-oxygen-carbon monoxide combustion mixture against a cool inert gas; moreover, the combustion mixture preferably contains no larger proportion of auxiliary heating component (for example carbon monoxide and associated oxygen) than is needed to cause complete combustion of the titanium tetrachloride with good nucleation.

The formation of rutile is favored by replacing a small amount of the titanium tetrachloride with aluminum chloride or other rutile promoter, by increasing the proportion of the auxiliary heating component in the gas, and by burning the pigment-producing gaseous combustion mixture against a column of burning gas. The latter gas may be carbon monoxide-oxygen in 1:0.5 molar ratio with or without diluent, or the pigment-producing gas itself. Use of the latter gas provides a high intensity combustion with yield of good rutile pigment and is accordingly preferred.

The pigment-producing titanium tetrachloride gaseous combustion mixtures referred to in general are those described in said application Serial No. 519,892. They contain titanium tetrachloride and oxygen in approximately stoichiometrical proportions as principal pigment-producing components and preferably contain carbon monoxide and oxygen or similar materials as components furnishing auxiliary heat. They may contain one or more diluent gases which may be an inert gas or an excess of one of the reactive components. There is no maximum as to the proportion of auxiliary heat-giving component which may be present. However, satisfactory flame stability and well nucleated pigment generally results when the weight of the auxiliary heating component is between about 10% and 150% of the weight of the titanium tetrachloride and its associated oxygen.

The pigment-producing combustion mixture may contain the usual minor amounts, up to about 10% by weight, of additional chlorides added for pigment modifying purposes, for example, aluminum trichloride, antimony trichloride, phosphorus tri- and -pentachloride, and silicon tetrachloride. The gas may contain large amounts of material such as silicon tetrachloride for formation of extended or blended pigments. The gas may also contain small amounts, up to a total of 1%, of water, hydrogen, nitrogen oxides, and combustible hydrogen-containing organic vapors, for example, hydrocarbons, alcohols, ketones, esters and ethers as nucleation promoters. However, radiation of energy from the flame area back into the advancing stream is intense and is generally sufficient to form enough nuclei for development of pigment of good particle size making nucleation agents unnecessary.

The combustion product of the present invention is substantially a suspension of pigment in chlorine. The combustion product may be passed directly to conventional cooling and separatory equipment for recovery of the pigment. The residual gas may be processed to recover its chlorine content or may be recycled, with or without cooling, for use as an opposing gas as has already been described.

The invention does not primarily depend upon the particular form of apparatus employed or its dimensions, or the precise gas or gases supplied to the combustion zone.

In this specification the term "streamline flow" is used in its normal sense to designate flow of gas through a conduit wherein each increment of gas in the conduit forces along or displaces the gas ahead of it without turbulence, so that in general the gas molecules flow parallel to the longitudinal axis of the conduit, as shown by the flow lines in the drawing. In streamline flow, the average cross-section speed of the gas is at least about ⅓ of the speed of the gas at the axis of the conduit.

The term "laminar" is used likewise normally to describe a flame which is thin and disc-like, as distinguished from a streaming, diffuse or turbulent flame.

The invention will be further described by the examples which follow. These examples represent specific embodiments of the invention and are not to be construed as limitations thereon. Unless otherwise stated, gas speeds are converted to standard temperature and pressure, and the gas flow rates are accurate to 10%. Unless otherwise stated, descriptions of the flames are based upon the observed appearance of equivalent hydrocarbon-air flames.

*Example 1*

The following illustrates the manufacture of titanium dioxide pigment by combustion of a preformed homogeneous gaseous combustion mixture containing titanium tetrachloride and oxygen as principal pigment-producing components, according to the present invention.

The apparatus was constructed from aluminum tubing and sheeting in general accordance with the drawing. The burner conduits were horizontal and were 6" in diameter and 2' long; the gas feeder tubes were 1" in diameter and entered the burner conduits radially about 1″ from each end. The space between the open ends of the conduits was 2.5″. Each conduit contained ten 40-mesh stainless steel screens 1″ apart (the last screen on each side being ¼″ from the tube opening), which leveled the transverse velocity profile of the gas very satisfactorily.

Dowtherm at about 250° was circulated as coolant between the walls of the hood. With valve 8 turned off and valve 10 turned on as shown in the drawing, the apparatus was brought to operating temperature by burning a mixture composed of 2.5% by volume of commercial propane and 97.5% by volume of air between the conduits. The mixture was ignited by introduction of a city gas flame between the tubes. Two flat vertical and apparently free-floating laminar flames (estimated to be 1.0 cm. to 0.1 cm. in thickness, 6.5″ in diameter and 1.25″ apart) were observed when the gas flow rate was adjusted to about 25 cm./sec. (S.T.P.). The feed of gas was then switched to a combustion mixture composed of 1 mol of $TiCl_4$ and 1 mol of $O_2$ as pigment-producing component, 5 mols of CO and 2.5 mols of $O_2$ as auxiliary heat component (100% of auxiliary heat component, based on the weight of pigment-producing component), and 3.65 mols of oxygen to ensure complete and rapid reaction of the titanium tetrachloride and as diluent.

The temperature of the combustion gas on admission to the feeder tubes was 250° C. At an actual flow rate of 13 cm./sec. (pressure less than 1″ of water) the mixture burned steadily and uniformly. The rate of flow of the Dowtherm was controlled so that its exit temperature did not exceed 350° C.

The gas flow rate was increased and decreased by 5%; the flame remained stable in each instance. The product was a mixed anatase-rutile pigment of good quality. After an hour of running there was negligible pigment build-up in the burner conduits.

Supply of gas to the right-hand burner was then cut off, so that the combustion proceeded in the same manner as disclosed in said application Serial No. 519,892. The flame flickered and the flow rate of the gas was continuously controlled in an effort to maintain uniform combustion. However, after a few moments the flame ceased to respond to control and went out.

*Example 2*

The following illustrates a method of producing anatase by burning a titanium tetrachloride-oxygen mixture against a column of cool inert gas.

The general procedure of Example 1 was repeated, except that the warm-up step (combustion of propane) was omitted, the pigment-producing $TiCl_4$-$O_2$-CO mixture was supplied to the left-hand burner conduit at an actual flow rate of 13 cm./sec., and nitrogen at 50° C. was supplied to the right-hand burner conduit at the same speed. Direct visual observation showed that the combustion gas burned as a free-floating laminar disc against the opposing column of cold inert gas. The flame was generally stable although the peripheral edges appeared to flap. The product was 80% anatase, as determined by X-ray diffraction.

*Example 3*

The following illustrates the manufacture of rutile pigment by burning titanium tetrachloride against a column of burning titanium tetrachloride.

The procedure of Example 1 was followed except that the titanium tetrachloride used contained 2.6% by weight of aluminum trichloride as rutile promoter. A similar combustion took place. The product was 90% rutile, as determined by X-ray diffraction.

*Example 4*

The procedure of Example 1 was repeated except that the burner conduits were vertical so that the flames were horizontal, and the hood cooler was modified to permit the combustion products to flow radially away from the flame over a 360° arc.

In a series of runs, the average tinting strength of pigment produced by the horizontal flames was about 10% higher than the average tinting strength of pigment produced by vertical flames according to Example 1. Evidently combustion conditions within horizontal flames are more uniform.

We claim:
1. A method of manufacturing titanium dioxide pigment which comprises burning a preformed homogeneous gaseous combustion mixture containing titanium tetrachloride and oxygen as principal pigment-producing components as a substantially flat laminar flame directly against a directly opposing column of gas in streamline flow.

2. A method according to claim 1 wherein the combustion mixture contains 1% to 3% of aluminum chloride, based on the weight of titanium tetrachloride therein, and the product is predominantly rutile.

3. A method of manufacturing titanium dioxide pigment which comprises burning a preformed homogeneous gaseous combustion mixture containing titanium tetrachloride and oxygen as principal pigment-producing components as a substantially flat laminar flame directly against a directly opposing column of substantially inert gas in streamline flow.

4. A method of manufacturing titanium dioxide pigment which comprises burning a preformed homogeneous gaseous combustion mixture containing titanium tetrachloride and oxygen as principal pigment-producing components as a substantially flat laminar flame directly against a directly opposing column of substantially inert gas having a temperature below 50° C. in streamline flow.

5. A method of manufacturing titanium dioxide pigment which comprises burning a preformed homogeneous gaseous combustion mixture containing titanium tetrachloride and oxygen as principal pigment-producing components as a substantially flat laminar flame directly against a directly opposing column of an inert gaseous mixture consisting essentially of chlorine and carbon dioxide in streamline flow.

6. A method of manufacturing titanium dioxide pigment which comprises burning a preformed homogeneous gaseous combustion mixture containing titanium tetrachloride and oxygen as principal pigment-producing components as a substantially flat laminar flame directly against a directly opposing column of carbon monoxide and oxygen burning in streamline flow.

7. A method of manufacturing titanium dioxide pigment which comprises passing a preformed homogeneous gaseous combustion mixture containing titanium tetrachloride and oxygen as principal pigment-producing components in streamline flow out of a first conduit, passing a gas in streamline flow out of a second conduit opposed to said first conduit and spaced therefrom, and burning the gaseous mixture from said first conduit as a substantially flat laminar flame between said conduits.

8. A method according to claim 7 wherein the gas passing out of the second conduit is substantially the same as the gaseous combustion mixture passing out of the first conduit.

9. A method according to claim 8 wherein the temperatures of the gases passing out of the first and second conduits is between 150° C. and 350° C.

10. A method of manufacturing titanium dioxide pigment which comprises passing in streamline flow out of a first conduit a preformed homogeneous gaseous combustion mixture containing titanium tetrachloride and oxygen as principal pigment-producing components and between 10% and 150%, based on the weight of said pigment-producing components, of carbon monoxide and additional oxygen as components furnishing auxiliary heat, passing a gas of substantially the same composition in streamline flow out of a second conduit opposed to said first conduit and spaced therefrom, and burning said gaseous mixtures as two substantially flat laminar flames between said conduits.

11. A method of manufacturing titanium dioxide pigment which comprises passing a preformed homogeneous gaseous combustion mixture containing titanium tetrachloride and oxygen as principal pigment-producing components in streamline flow out of a first conduit and out of a second conduit directly opposed to said first conduit and spaced therefrom, and burning the gaseous mixtures from said conduits as substantially laminar flames between said conduits.

12. A method of manufacturing titanium dioxide pigment which comprises burning a preformed homogeneous gaseous combustion mixture containing titanium tetrachloride and oxygen as principal pigment-producing components as a substantially flat-horizontal laminar flame directly against a directly opposing column of gas in streamline flow.

13. A process according to claim 11 wherein the conduits are vertical, whereby the gaseous mixtures are burned as horizontal flames.

References Cited in the file of this patent

UNITED STATES PATENTS

| | | | |
|---|---|---|---|
| 2,347,496 | Muskat et al. | Apr. 25, | 1944 |
| 2,445,691 | Pechukas | July 20, | 1948 |
| 2,596,421 | McKinnis | May 13, | 1952 |
| 2,635,946 | Weber et al. | Apr. 21, | 1953 |
| 2,779,660 | Robell | Jan. 29, | 1957 |
| 2,779,661 | Robell | Jan. 29, | 1957 |
| 2,779,662 | Frey | Jan. 29, | 1957 |

UNITED STATES PATENT OFFICE
CERTIFICATE OF CORRECTION

Patent No. 3,121,641 February 18, 1964

John P. Wikswo et al.

It is hereby certified that error appears in the above numbered patent requiring correction and that the said Letters Patent should read as corrected below.

Column 1, line 12, for "July 15, 1957" read -- July 15, 1958 --.

Signed and sealed this 7th day of July 1964.

(SEAL)
Attest:

ERNEST W. SWIDER
Attesting Officer

EDWARD J. BRENNER
Commissioner of Patents